US012277944B2

(12) United States Patent
Jansson et al.

(10) Patent No.: US 12,277,944 B2
(45) Date of Patent: *Apr. 15, 2025

(54) ADAPTIVE COMFORT NOISE PARAMETER DETERMINATION

(71) Applicant: Telefonaktiebolaget LM Ericsson (publ), Stockholm (SE)

(72) Inventors: Fredrik Jansson, Sundbyberg (SE); Tomas Jansson Toftgård, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,319

(22) Filed: Apr. 26, 2023

(65) Prior Publication Data

US 2023/0410820 A1 Dec. 21, 2023

Related U.S. Application Data

(63) Continuation of application No. 17/256,073, filed as application No. PCT/EP2019/067037 on Jun. 26, 2019, now Pat. No. 11,670,308.

(Continued)

(51) Int. Cl.
*G10L 19/00* (2013.01)
*G10L 19/008* (2013.01)
(Continued)

(52) U.S. Cl.
CPC .......... *G10L 19/012* (2013.01); *G10L 19/008* (2013.01); *G10L 25/84* (2013.01); *G10L 2025/786* (2013.01)

(58) Field of Classification Search
CPC ..... G10L 19/012; G10L 19/008; G10L 25/84; G10L 2025/786
See application file for complete search history.

(56) References Cited

U.S. PATENT DOCUMENTS 9,443,526 B2 * 9/2016 Jansson Toftgård .. G10L 19/012
2008/0027716 A1 * 1/2008 Rajendran ............. G10L 19/012 704/E19.006

(Continued)

FOREIGN PATENT DOCUMENTS

CN 101213591 A 7/2008
CN 101335000 A 12/2008

(Continued)

OTHER PUBLICATIONS

Wang Z, Miao L, Gibbs J, Toftgård T, Sehlstedt M, Bruhn S, Atti V, Rajendran V, Dewasurendra D. Linear prediction based comfort noise generation in the EVS codec. In 2015 IEEE International Conference on Acoustics, Speech and Signal Processing (ICASSP) Apr. 19, 2015 (pp. 5903-5907). IEEE. (Year: 2015).*

(Continued)

*Primary Examiner* — Douglas Godbold
*Assistant Examiner* — Parker Mayfield
(74) *Attorney, Agent, or Firm* — Rothwell, Figg, Ernst & Manbeck, P.C.

(57) ABSTRACT

A method for generating a comfort noise (CN) parameter is provided. The method includes receiving an audio input; detecting, with a Voice Activity Detector (VAD), a current inactive segment in the audio input; as a result of detecting, with the VAD, the current inactive segment in the audio input, calculating a CN parameter $CN_{used}$; and providing the CN parameter $CN_{used}$ to a decoder. The CN parameter $CN_{used}$ is calculated based at least in part on the current inactive segment and a previous inactive segment.

14 Claims, 12 Drawing Sheets

Related U.S. Application Data

(60) Provisional application No. 62/691,069, filed on Jun. 28, 2018.

(51) Int. Cl.

*G10L 19/012* (2013.01)
*G10L 25/84* (2013.01)
*G10L 25/78* (2013.01)

(56) References Cited

U.S. PATENT DOCUMENTS

| | | | | |
|---|---|---|---|---|
| 2008/0059161 | A1* | 3/2008 | Khalil | G10L 19/012 704/226 |
| 2010/0280823 | A1* | 11/2010 | Shlomot | G10L 19/012 704/201 |
| 2017/0047072 | A1* | 2/2017 | Eriksson | G10L 19/03 |
| 2017/0352354 | A1 | 12/2017 | Jansson Toftgård | |

FOREIGN PATENT DOCUMENTS

| | | | |
|---|---|---|---|
| CN | 101496095 | A | 7/2009 |
| CN | 104584120 | A | 4/2015 |
| WO | 2015122809 | A1 | 8/2015 |

OTHER PUBLICATIONS

International Search Report and the Written Opinion of the International Searching Authority, issued in corresponding International Application No. PCT/EP2019/067037, dated Sep. 11, 2019, 13 pages.

Wang, Z., et al., "Linear prediction based comfort noise generation in the EVS codec," In 2015 IEEE International Conference on Acoustics, Speech and Signal Processing (ICASSP) Apr. 19, 2015 (pp. 5903-5907). IEEE (Year: 2015).

* cited by examiner

ADAPTIVE COMFORT NOISE PARAMETER DETERMINATION

CROSS REFERENCE TO RELATED APPLICATION(S)

This application is a continuation of U.S. application Ser. No. 17/256,073, filed Dec. 24, 2020, which is a 35 U.S.C. § 371 National Phase of PCT/EP2019/067037, filed Jun. 26, 2019, designating the United States, which claims the benefit of U.S. Provisional Application No. 62/691,069, filed Jun. 28, 2018, the disclosures of which are incorporated herein by this reference.

TECHNICAL FIELD

Disclosed are embodiments related to comfort noise (CN) generation.

BACKGROUND

Although the capacity in telecommunication networks is continuously increasing, it is still of great interest to limit the required bandwidth per communication channel. In mobile networks, less transmission bandwidth for each call means that the mobile network can service a larger number of users in parallel. Lowering the transmission bandwidth also yields lower power consumption in both the mobile device and the base station. This translates to energy and cost saving for the mobile operator, while the end user will experience prolonged battery life and increased talk-time.

One such method for reducing the transmitted bandwidth in speech communication is to exploit the natural pauses in the speech. In most conversations only one talker is active at a time thus the speech pauses in one direction will typically occupy more than half of the signal. The way to use this property of a typical conversation to decrease the transmission bandwidth is to employ a Discontinuous Transmission (DTX) scheme, where the active signal coding is discontinued during speech pauses. DTX schemes are standardized for all 3GPP mobile telephony standards, i.e. 2G, 3G and VoLTE. It is also commonly used in Voice over IP systems.

During speech pauses it is common to transmit a very low bit rate encoding of the background noise to allow for a Comfort Noise Generator (CNG) in the receiving end to fill the pauses with a background noise having similar characteristics as the original noise. The CNG makes the sound more natural since the background noise is maintained and not switched on and off with the speech. Complete silence in the inactive segments (i.e. speech pauses) is perceived as annoying and often leads to the misconception that the call has been disconnected.

A DTX scheme further relies on a Voice Activity Detector (VAD), which indicates to the system whether to use the active signal encoding methods in or the low rate background noise encoding in active respectively inactive segments. The system may be generalized to discriminate between other source types by using a (Generic) Sound Activity Detector (GSAD or SAD), which not only discriminates speech from background noise but also may detect music or other signal types which are deemed relevant.

Communication services may be further enhanced by supporting stereo or multichannel audio transmission. In these cases, a DTX/CNG system also needs to consider the spatial characteristics of the signal in order to provide a pleasant sounding comfort noise.

A common CN generation method, e.g. used in all 3GPP speech codecs, is to transmit information on the energy and spectral shape of the background noise in the speech pauses. This can be done using significantly less number of bits than the regular coding of speech segments. At the receiver side the CN is generated by creating a pseudo-random signal and then shaping the spectrum of the signal with a filter based on information received from the transmitting side. The signal generation and spectral shaping can be done in the time or the frequency domain.

SUMMARY

In a typical DTX system, the capacity gain comes from the fact that the CN is encoded with fewer bits than the regular encoding. Part of this saving in bits comes from the fact that the CN parameters are normally sent less frequently than the regular coding parameters. This normally works well since the background noise character is not changing as fast as e.g. a speech signal. The encoded CN parameters are often referred to as a “SID frame” where SID stands for Silence Descriptor.

A typical case is that the CN parameters are sent every 8th speech encoder frame (one speech encoder frame is typically 20 ms) and these are then used in the receiver until the next set of CN parameters is received (see FIG. 2). One solution to avoid undesired fluctuations in the CN is to sample the CN parameters during all 8 speech encoder frames and then transmit an average or some other way to base the parameters on all 8 frames as shown in FIG. 3.

In the first frame in a new inactive segment (i.e. directly after a speech burst), it may not be possible to use an average taken over several frames. Some codecs, like the 3GPP EVS codec, are using a so-called hangover period preceding inactive segments. In this hangover period, the signal is classified as inactive but active coding is still used for up to 8 frames before inactive encoding starts. One reason for this is to allow averaging of the CN parameters during this period (see FIG. 4). If the active period has been short, the length of the hangover period is shorted or even omitted completely in order not to let a short active sound burst trigger a much longer hangover period and thereby giving an unnecessary increase of the active transmission periods (see FIG. 5).

An issue with the above solution is that the first CN parameter set cannot always be sampled over several speech encoder frames but will instead be sampled in fewer or even only one frame. This can lead to a situation where inactive segments start with a CN that is different in the beginning and then changes and stabilizes when the transmission of the averaged parameters commences. This may be perceived as annoying for the listener, especially if it occurs frequently.

In embodiments of the present invention, a CN parameter is typically determined based on signal characteristics over the period between two consecutive CN parameter transmissions while in an inactive segment. The first frame in each inactive segment is however treated differently: here the CN parameter is based on signal characteristics of the first frame of inactive coding, typically a first SID frame, and any hangover frames, and also signal characteristics of the last-sent SID frame and any inactive frames after that in the end of the previous inactive segment. Weighting factors are applied such that the weight for the data from the previous inactive segment is decreasing as a function of the length of the active segment in-between. The older the previous data is, the less weight it gets.

Embodiments of the present invention improve the stability of CN generated in a decoder, while being agile enough to follow changes in the input signal.

According to a first aspect, a method for generating a comfort noise (CN) parameter is provided. The method includes receiving an audio input; detecting, with a Voice Activity Detector (VAD), a current inactive segment in the audio input; as a result of detecting, with the VAD, the current inactive segment in the audio input, calculating a CN parameter $CN_{used}$; and providing the CN parameter $CN_{used}$ to a decoder. The CN parameter $CN_{used}$ is calculated based at least in part on the current inactive segment and a previous inactive segment.

In some embodiments, calculating the CN parameter includes calculating $$CN_{used}=f(T_{active},T_{curr},T_{prev},CN_{curr},CN_{prev}),$$

where:

- $CN_{curr}$ refers to a CN parameter from a current inactive segment;
- $CN_{prev}$ refers to a CN parameter from a previous inactive segment;
- $T_{prev}$ refers to a time-interval parameter related to $CN_{prev}$;
- $T_{curr}$ refers to a time-interval parameter related to $CN_{curr}$; and
- $T_{active}$ refers to a time-interval parameter of an active segment between the previous inactive segment and the current inactive segment.

In some embodiments, the function $f(\bullet)$ is defined as a weighted sum of functions $g_1(\bullet)$ and $g_2(\bullet)$ such that the CN parameter $CN_{used}$ is given by:

$$CN_{used}=W_1(T_{active},T_{curr},T_{prev})*g_1(CN_{curr},T_{curr})+W_2(T_{active},T_{curr},T_{prev})*g_2(CN_{prev},T_{prev})$$

where $W_1(\bullet)$ and $W_2(\bullet)$ are weighting functions. In some embodiments, $W_1(\bullet)$ and $W_2(\bullet)$ sum to unity such that $W_2(T_{active},T_{curr},T_{prev})=1-W_1(T_{active},T_{curr},T_{prev})$. In some embodiments, the functions $g_1(\bullet)$ represents an average over the time period $T_{curr}$ and the function $g_2(\bullet)$ represents an average over the time period $T_{prev}$. In some embodiments, the weighting functions $W_1(\bullet)$ and $W_2(\bullet)$ are functions of $T_{active}$ alone, such that $W_1(T_{active},T_{curr},T_{pre})=W_1(T_{active})$ and $W_2(T_{active},T_{curr},T_{prev})=W_2(T_{active})$. In some embodiments, $0<W_1(\bullet)\leq 1$ and $0<1-W_2(\bullet)\leq 1$, and wherein as the time $T_{active}$ approaches infinity, $W_1(\bullet)$ converges to 1 and $W_2(\bullet)$ converges to 0 in the limit.

In some embodiments, the function $f(\bullet)$ is defined such that the CN parameter $CN_{used}$ is given by $$CN_{used}=\frac{W_1(T_{active})*\sum_{i=0}^{N_{curr}-1}CN_{curr}(i)+W_2(T_{active})*\sum_{k=0}^{N_{prev}-1}CN_{prev}(k)}{W_1(T_{active})*N_{curr}+W_2(T_{active})*N_{prev}}$$

where $N_{curr}$ represents the number of frames corresponding to the time-interval parameter $T_{curr}$ and $N_{prev}$ represents the number of frames corresponding to the time-interval parameter $T_{prev}$; and where $W_1(T_{active})$ and $W_2(T_{active})$ are weighting functions.

According to a second aspect, a method for generating a comfort noise (CN) side-gain parameter is provided. The method includes receiving an audio input, wherein the audio input comprises multiple channels; detecting, with a Voice Activity Detector (VAD), a current inactive segment in the audio input; as a result of detecting, with the VAD, the current inactive segment in the audio input, calculating a CN side-gain parameter SG(b) for a frequency band b; and providing the CN side-gain parameter SG(b) to a decoder. The CN side-gain parameter SG(b) is calculated based at least in part on the current inactive segment and a previous inactive segment.

In some embodiments, calculating the CN side-gain parameter SG(b) for a frequency band b, includes calculating $$SG(b)=\frac{\sum_{i=0}^{N_{curr}-1}SG_{curr}(b,i)+W(\text{nF})*\sum_{j=0}^{N_{prev}-1}SG_{prev}(b,j)}{N_{curr}+W(\text{nF})*N_{prev}}$$

where:

- $SG_{curr}(b,i)$ represents a side gain value for frequency band b and frame i in current inactive segment;
- $SG_{pre}(b,j)$ represents a side gain value for frequency band b and frame j in previous inactive segment;
- $N_{curr}$ represents the number of frames in the sum from current inactive segment;
- $N_{prev}$ represents the number of frames in the sum from previous inactive segment;
- W(k) represents a weighting function; and
- nF represents the number of frames in the active segment between the current segment and the previous inactive segment, corresponding to $T_{active}$.

In some embodiments, W(k) is given by $$W(k)=\begin{cases}\frac{0.8*(1500-k)}{1500}+0.2, & k<1500\\ 0.2, & k\geq 1500\end{cases}.$$

According to a third aspect, a method for generating comfort noise (CN) is provided. The method includes receiving a CN parameter $CN_{used}$ generated according to any one of the embodiments of the first aspect, and generating comfort noise based on the CN parameter $CN_{used}$.

According to a fourth aspect, a method for generating comfort noise (CN) is provided. The method includes receiving a CN side-gain parameter SG(b) for a frequency band b generated according to any one of the embodiments of the second aspect, and generating comfort noise based on the CN parameter SG(b).

According to a fifth aspect, a node for generating a comfort noise (CN) parameter is provided. The node includes a receiving unit configured to receive an audio input; a detecting unit configured to detect, with a Voice Activity Detector (VAD), a current inactive segment in the audio input; a calculating unit configured to calculate, as a result of detecting, with the VAD, the current inactive segment in the audio input, a CN parameter $CN_{used}$; and a providing unit configured to provide the CN parameter $CN_{used}$ to a decoder. The CN parameter $CN_{used}$ is calculated by the calculating unit based at least in part on the current inactive segment and a previous inactive segment.

In some embodiments, the calculating unit is further configured to calculate the CN parameter $CN_{used}$ by calculating $$CN_{used}=f(T_{active},T_{curr},T_{prev},CN_{curr},CN_{prev}),$$

where:

- $CN_{curr}$ refers to a CN parameter from a current inactive segment;
- $CN_{prev}$ refers to a CN parameter from a previous inactive segment;

$T_{prev}$ refers to a time-interval parameter related to $CN_{prev}$;

$T_{curr}$ refers to a time-interval parameter related to $CN_{curr}$; and $T_{active}$ refers to a time-interval parameter of an active segment between the previous inactive segment and the current inactive segment.

According to a sixth aspect, a node for generating a comfort noise (CN) side-gain parameter is provided. The node includes a receiving unit configured to receive an audio input, wherein the audio input comprises multiple channels; a detecting unit configured to detect, with a Voice Activity Detector (VAD), a current inactive segment in the audio input; a calculating unit configured to calculate, as a result of detecting, with the VAD, the current inactive segment in the audio input, a CN side-gain parameter SG(b) for a frequency band b; and a providing unit configured to provide the CN side-gain parameter SG(b) to a decoder. The CN side-gain parameter SG(b) is calculated based at least in part on the current inactive segment and a previous inactive segment In some embodiments, the calculating unit is further configured to calculate the CN side-gain parameter SG(b) for a frequency band b, by calculating $$SG(b) = \frac{\sum_{i=0}^{N_{curr}-1} SG_{curr}(b, i) + W(\text{nF}) * \sum_{j=0}^{N_{prev}-1} SG_{prev}(b, j)}{N_{curr} + W(\text{nF}) * N_{prev}}$$

where:

$SG_{curr}(b,i)$ represents a side gain value for frequency band b and frame i in current inactive segment;

$SG_{prev}(b,j)$ represents a side gain value for frequency band b and frame j in previous inactive segment;

$N_{curr}$ represents the number of frames in the sum from current inactive segment;

$N_{prev}$ represents the number of frames in the sum from previous inactive segment;

W(k) represents a weighting function; and nF represents the number of frames in the active segment between the current segment and the previous inactive segment, corresponding to $T_{active}$.

According to a seventh aspect, a node for generating comfort noise (CN) is provided. The node includes a receiving unit configured to receive a CN parameter $CN_{used}$ generated according to any one of the embodiments of the first aspect; and a generating unit configured to generate comfort noise based on the CN parameter $CN_{used}$.

According to an eighth aspect, a node for generating comfort noise (CN) is provided. The node includes a receiving unit configured to receive a CN side-gain parameter SG(b) for a frequency band b generated according to any one of the embodiments of the second aspect; and a generating unit configured to generate comfort noise based on the CN parameter SG(b).

According to a ninth aspect, a computer program is provided, comprising instructions which when executed by processing circuitry of a node causes the node to perform the method of any one of the embodiments of the first and second aspects.

According to a tenth aspect, a carrier is provided, containing the computer program of any of the embodiments of the ninth aspect, wherein the carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

DETAILED DESCRIPTION

In many cases, e.g. a person standing still with his mobile telephone, the background noise characteristics will be stable over time. In these cases it will work well to use the CN parameters from the previous inactive segment as a starting point in the current inactive segment, instead of relying on a more unstable sample taken in a shorter period of time in the beginning of the current inactive segment.

There are, however, cases where background noise conditions may change over time. The user can move from one location to another, e.g. from a silent office out to a noisy street. There might also be things in the environment that change even if the telephone user is not moving, e.g. a bus driving by on the street. This means that it might not always work well to base the CN parameters on signal characteristics from the previous inactive segment.

Figure 1:
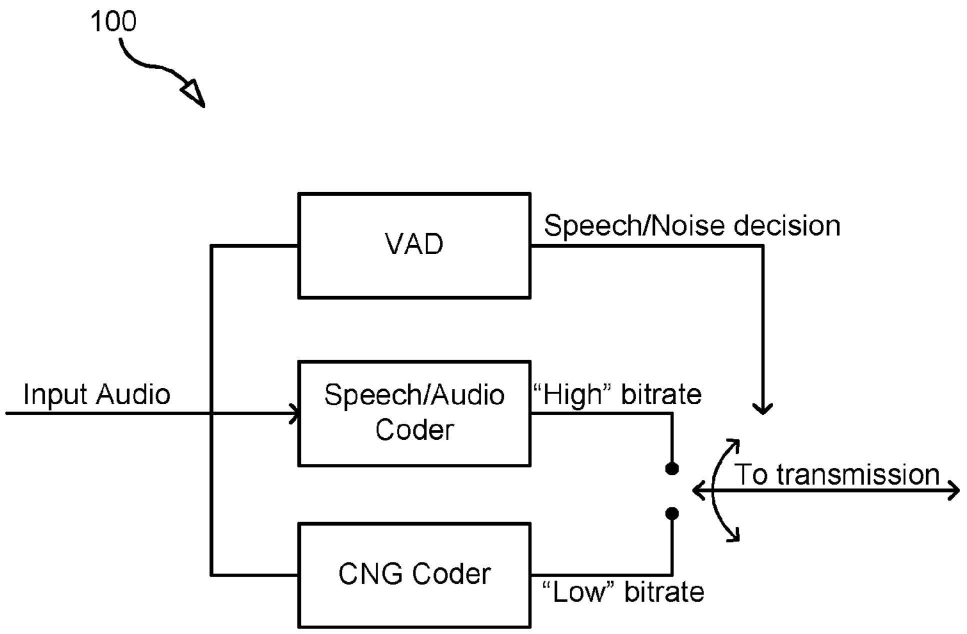
FIG. 1 illustrates a DTX system according to one embodiment.
Figure 2:
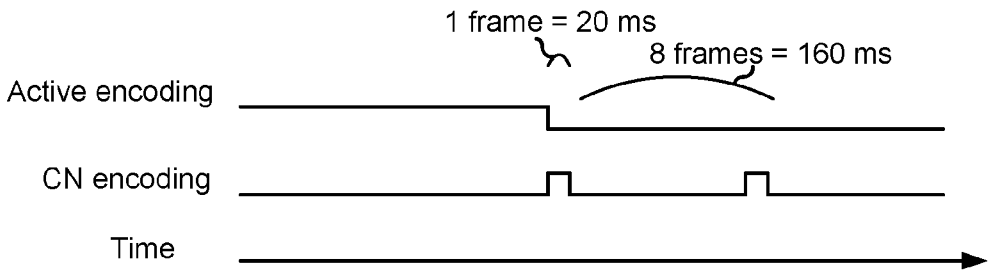
FIG. 2 is a diagram illustrating CN parameter encoding and transmission according to one embodiment.
Figure 3:
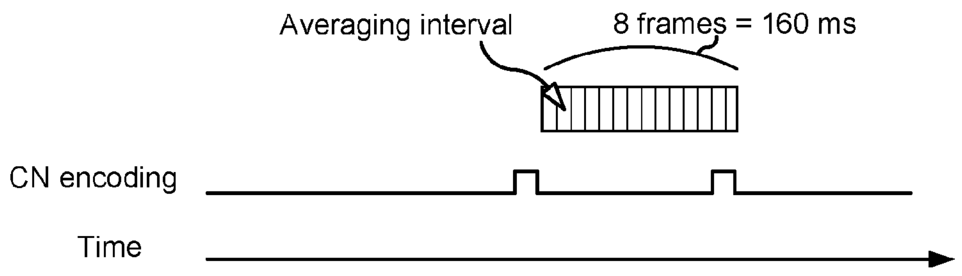
FIG. 3 is a diagram illustrating averaging according to one embodiment.
Figure 4:
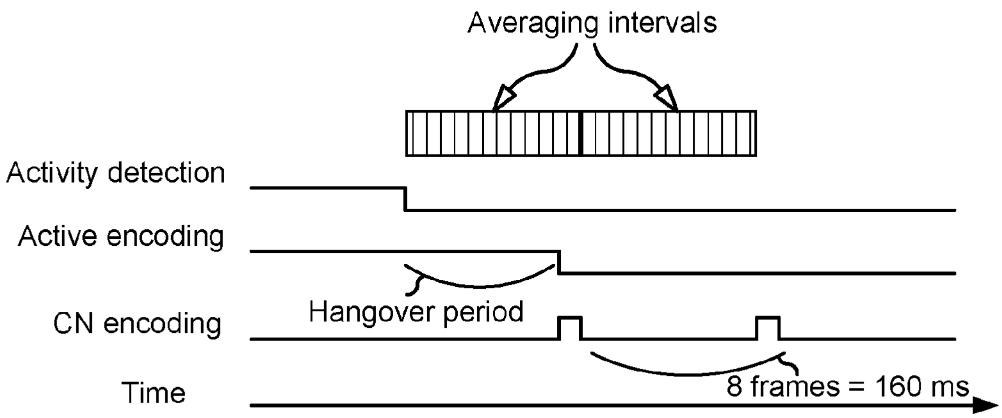
FIG. 4 is a diagram illustrating averaging with a hangover period according to one embodiment.
Figure 5:
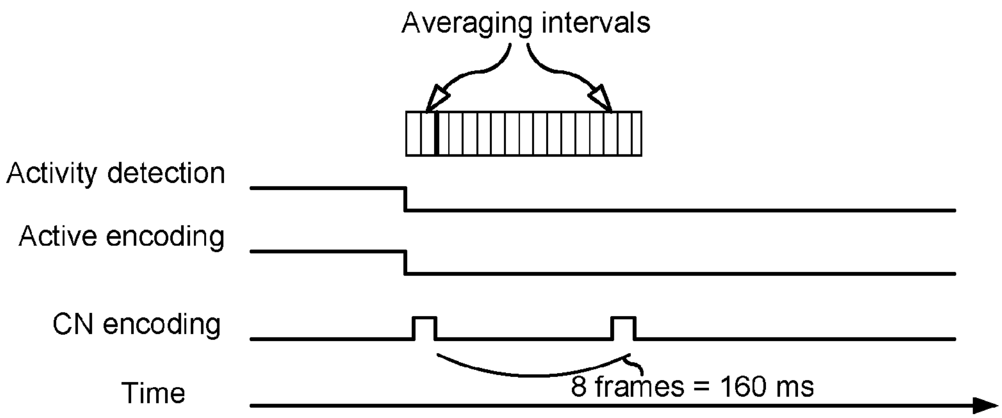
FIG. 5 is a diagram illustrating averaging with no hangover period according to one embodiment.

FIG. 1 illustrates a DTX system 100 according to some embodiments. In DTX system 100, an audio signal is received as input. System 100 includes three modules, a Voice Activity Detector (VAD), a Speech/Audio Coder, and a CNG Coder. The VAD module makes a speech/noise decision (e.g. detecting active or inactive segments, such as segments of active speech or no speech). If there is speech, the speech/audio coder will code the audio signal and send the result to be transmitted. If there is no speech, the CNG Coder will generate comfort noise parameters to be transmitted.

Embodiments of the present invention aim to adaptively balance the above-mentioned aspects for an improved DTX system with CNG. In embodiments, a comfort noise parameter $CN_{used}$ may be determined as follows based on a function $f(\cdot)$:

$$CN_{used} = f(T_{active}, T_{curr}, T_{prev}, CN_{curr}, CN_{prev})$$

In the equation above, the variables referenced have the following meanings:

$CN_{used}$ CN parameter used for CN generation
$CN_{curr}$ CN parameters from a current inactive segment
$CN_{prev}$ CN parameters from a previous inactive segment
$T_{prev}$ Time-interval parameter for determination of CN parameters of a previous inactive segment
$T_{curr}$ Time-interval parameter for determination of CN parameters of a current inactive segment
$T_{active}$ Time-interval parameter of an active segment in between the previous and current inactive segments In one embodiment, the function $f(\bullet)$ is defined as a weighted sum of functions $g_1(\bullet)$ and $g_2(\bullet)$ of $CN_{curr}$ and $CN_{prev}$, i.e.

$$CN_{used}=W_1(T_{active},T_{curr},T_{prev})*g_1(CN_{curr},T_{curr})+W_2(T_{active},T_{curr},T_{prev})*g_2(CN_{prev},T_{prev})$$

where $W_1(\bullet)$ and $W_2(\bullet)$ are weighting functions.

The functions $g_1(\bullet)$ and $g_2(\bullet)$ may for example, in an embodiment, be an average over the time periods $T_{curr}$ and $T_{prev}$ respectively. In embodiments, typically $\Sigma W_i=1$.

In some embodiments, the weighting between previous and current CN parameter averages may be based only on the length of the active segment, i.e. on $T_{active}$. For example, the following equation may be used:

$$CN_{used} = W(T_{active})*\frac{\sum_{i=0}^{N_{curr}-1} CN_{curr}(i)}{N_{curr}} + (1-W(T_{active}))*\frac{\sum_{k=0}^{N_{prev}-1} CN_{prev}(k)}{N_{prev}}$$

In the equation above, the additional variables referenced have the following meanings:

$N_{curr}$ Number of frames used in current average, corresponds to $T_{curr}$
$N_{prev}$ Number of frames used in previous average, corresponds to $T_{prev}$
W(t) Weighting function, $0<W(t)\leq 1$, $W(\infty)=1$ An averaging of the parameter CN is done by using both an average taken from the current inactive segment and an average taken from the previous segment. These two values are then combined with weighting factors based on a weighting function that depends, in some embodiments, on the length of the active segment between the current and the previous inactive segment such that less weight is put on the previous average if the active segment is long and more weight if it is short.

In another embodiment, the weights are additionally adapted based on $T_{prev}$ and $T_{curr}$. This may, for example, mean that a larger weight is given the previous CN parameters because the $T_{curr}$ period is too short to give a stable estimate of the long-term signal characteristics that can be represented by the CNG system. An example of an equation corresponding to this embodiment follows:

$$CN_{used} = \frac{W_1(T_{active})*\sum_{i=0}^{N_{curr}-1} CN_{curr}(i) + W_2(T_{active})*\sum_{k=0}^{N_{prev}-1} CN_{prev}(k)}{W_1(T_{active})*N_{curr} + W_2(T_{active})*N_{prev}}$$

In the equation above, the additional variables referenced have the following meanings:

$N_{curr}$ Number of frames used in current average, corresponds to $T_{curr}$
$N_{prev}$ Number of frames used in previous average, corresponds to $T_{prev}$ $W_1(t)$, Weighting functions
$W_2(t)$ An established method for encoding a multi-channel (e.g. stereo) signal is to create a mix-down (or downmix) signal of the input signals, e.g. mono in the case of stereo input signals and determine additional parameters that are encoded and transmitted with the encoded downmix signal to be utilized for an up-mix at the decoder. In the stereo DTX case a mono signal may be encoded and generated as CN and stereo parameters will then be used create a stereo signal from the mono CN signal. The stereo parameters are typically controlling the stereo image in terms of e.g. sound source localization and stereo width.

In the case with a non-fixed stereo microphone, e.g. mobile telephone or a headset connected to the mobile phone, the variation in the stereo parameters may be faster than the variation in the mono CN parameters.

To illustrate this with an example: turning your head 90 degrees can be done very fast but moving from one type of background noise environment to another will take a longer time. The stereo image will in many cases be continuously changing since it is hard to keep your mobile telephone or headset in the same position for any longer period of time. Because of this, embodiments of the present invention can be especially important for stereo parameters.

One example of a stereo parameter is the side gain SG. A stereo signal can be split into a mix-down signal DMX and a side signal S:

$$DMX(t)=L(t)+R(t)$$

$$S(t)=L(t)-R(t)$$

where L(t) and R(t) refer, respectively, to the Left and Right audio signal. The corresponding up-mix would then be:

$$L(t)=\frac{DMX(t)+S(t)}{2}$$

$$R(t)=\frac{DMX(t)-S(t)}{2}$$

In order to save bits for transmission of an encoded stereo signal, some components $\hat{S}(t)$ of the side signal S might be predicted from the DMX signal by utilizing a side gain parameter SG according to:

$$\hat{S}(t)=SG\cdot DMX(t)$$

A minimized prediction error $E(t)=(\hat{S}(t)-S(t))^2$ can be obtained by:

$$SG=\frac{<S(t),DMX(t)>}{<DMX(t),DMX(t)>}$$

where <•,•> denotes an inner product between the signals (typically frames thereof).

Side gains may be determined in broad-band from time domain signals, or in frequency sub-bands obtained from downmix and side signals represented in a transform domain, e.g. the Discrete Fourier Transform (DFT) or Modified Discrete Cosine Transform (MDCT) domains, or by some other filterbank representation. If a side gain in the first frame of CNG would be significantly based on a previous inactive segment, and differ significantly from the following frames, the stereo image would change drastically in the beginning of an inactive segment compared to the slower pace during the rest of the inactive segment. This would be perceived as annoying by the listener, especially if it is repeated every time a new inactive segment (i.e. speech pause) starts.

The following formula shows one example of how embodiments of the present invention can be used to obtain CN side-gain parameters from frequency divided side gain parameters.

$$SG(b) = \frac{\sum_{i=0}^{N_{curr}-1} SG_{curr}(b, i) + W(\mathrm{nF}) * \sum_{j=0}^{N_{prev}-1} SG_{prev}(b, j)}{N_{curr} + W(\mathrm{nF}) * N_{prev}}$$

Figure 6:
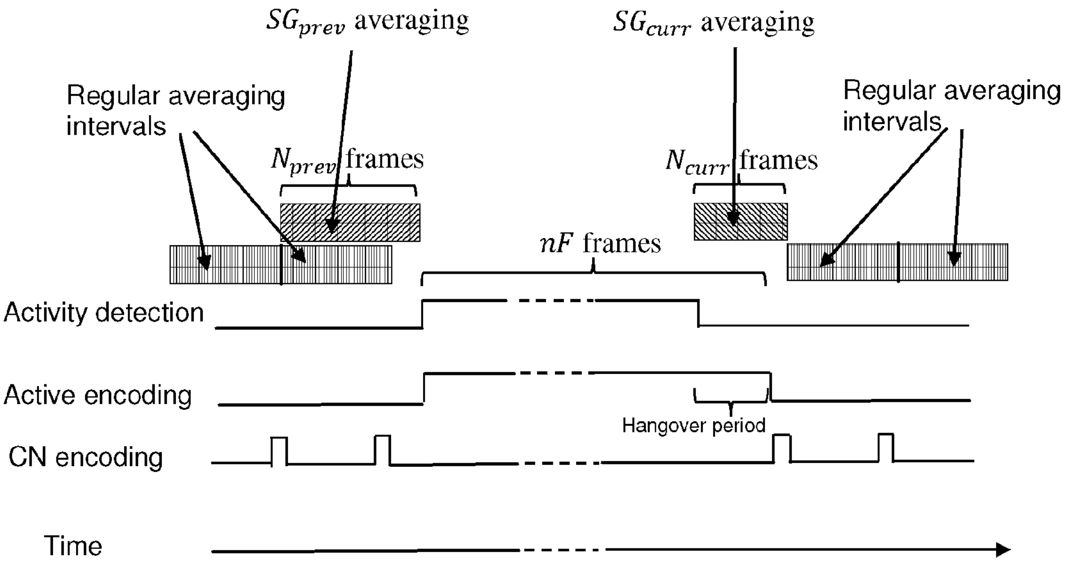
FIG. 6 is a diagram illustrating side gain averaging according to one embodiment.

In the equation above, the variables referenced have the following meanings:

$SG(b)$ Side gain value to be used in CN generation for frequency band b $SG_{curr}(b,i)$ Number of frames used in previous average, corresponds to $T_{prev}$ $SG_{prev}(b,j)$ Side gain value for frequency band b and frame j in previous inactive segment $N_{curr}$ Number of frames in the sum from current inactive segment $N_{prev}$ Number of frames in the sum from previous inactive segment $W(k)$ Weighting function. In some embodiments:

$$W(k) = \begin{cases} \frac{0.8 * (1500 - k)}{1500} + 0.2, & k < 1500 \\ 0.2, & k \geq 1500 \end{cases}$$

nF Number of frames in active segment between current and previous inactive segment, corresponds to $T_{active}$ FIG. 6 shows a schematic picture of how the side-gain averaging is done, according to an embodiment. Note that the combined weighted average is typically only used in the first frame of each interactive segment.

Note that $N_{curr}$ and $N_{prev}$ can differ from each other and from time to time. $N_{prev}$ will in addition to the frames of the last transmitted CN parameters also include the inactive frames (so-called no-data frames) between the last CN parameter transmission and the first active frames. An active frame can of course occur anytime, so this number will vary. $N_{curr}$ will include the number of frames in the hangover period plus the first inactive frame which may also vary if the length of the hangover period is adaptive. Ne may not only include consecutive hangover frames, but may in general represent the number of frames included in the determination of current CN parameters.

Note that changing the number of frames used in the average is just one way of changing the length of the time-interval on which the parameters are calculated. There are also other ways of changing the length of time-interval on which a parameter is based upon. For example, related to CN generation, the frame length in Linear Predictive Coding (LPC) analysis could also be changed.

Figure 7:
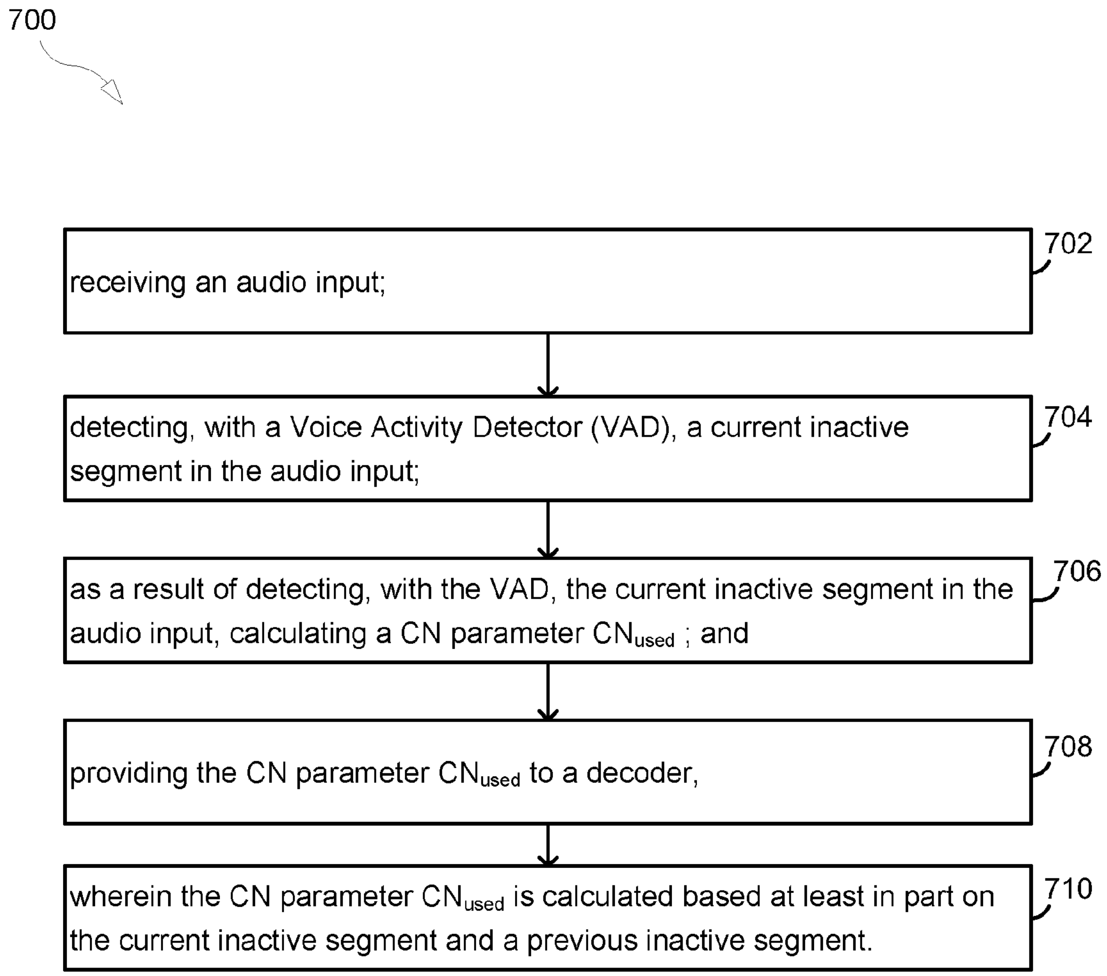
FIG. 7 is a flow chart illustrating a process according to one embodiment.

FIG. 7 illustrates a process 700 for generating a comfort noise (CN) parameter.

The method includes receiving an audio input (step 702). The method further includes detecting, with a Voice Activity Detector (VAD), a current inactive segment in the audio input (step 704). The method further includes, as a result of detecting, with the VAD, the current inactive segment in the audio input, calculating a CN parameter $CN_{use}$(step 706). The method further includes providing the CN parameter $CN_{used}$ to a decoder (step 708). The CN parameter $CN_{used}$ is calculated based at least in part on the current inactive segment and a previous inactive segment (step 710).

In some embodiments, calculating the CN parameter $CN_{used}$ includes calculating $CN_{used}=f(T_{active}, T_{curr}, T_{prev}, CN_{curr}, CN_{prev})$, where $CN_{curr}$ refers to a CN parameter from a current inactive segment; $CN_{prev}$ refers to a CN parameter from a previous inactive segment; $T_{prev}$ refers to a time-interval parameter related to $CN_{prev}$; $T_{curr}$ refers to a time-interval parameter related to $CN_{curr}$; and $T_{active}$ refers to a time-interval parameter of an active segment between the previous inactive segment and the current inactive segment.

In some embodiments, the function $f(\bullet)$ is defined as a weighted sum of functions $g_1(\bullet)$ and $g_2(\bullet)$ such that the CN parameter $CN_{used}$ is given by:

$$CN_{used}=W_1(T_{active},T_{curr},T_{prev})*g_1(CN_{curr},T_{curr})+W_2(T_{active},T_{curr},T_{prev})*g_2(CN_{prev},T_{prev})$$

where $W_1(\bullet)$ and $W_2(\bullet)$ are weighting functions. In some embodiment, $W_1(\bullet)$ and $W_2(\bullet)$ sum to unity such that $W_2(T_{active},T_{curr},T_{prev})=1-W_1(T_{active},T_{curr},T_{prev})$. In some embodiments, the functions $g(\bullet)$ represents an average over the time period $T_{curr}$ and the function $g_2(\bullet)$ represents an average over the time period $T_{prev}$. In some embodiments, the weighting functions $W_1(\bullet)$ and $W_2(\bullet)$ are functions of $T_{active}$ alone, such that $W_1(T_{active},T_{curr},T_{prev})=W_1(T_{active})$ and $W_2(T_{active}, T_{curr},T_{prev})=W_2(T_{active})$. In some embodiments, $$g_1(CN_{curr}, T_{curr}) = \frac{\sum_{i=0}^{N_{curr}-1} CN_{curr}(i)}{N_{curr}} \text{ and } g_2(CN_{curr}, T_{curr}) = \frac{\sum_{k=0}^{N_{prev}-1} CN_{prev}(k)}{N_{prev}},$$

where $N_{curr}$ represents the number of frames corresponding to the time-interval parameter $T_{curr}$ and $N_{prev}$ represents the number of frames corresponding to the time-interval parameter $T_{prev}$.

In some embodiments, $0<W_1(\bullet)\leq 1$ and $0<1-W_2(\bullet)\leq 1$, and as the time $T_{active}$ approaches infinity, $W_1(\bullet)$ converges to 1 and $W_2(\bullet)$ converges to 0 in the limit. In embodiments, the function $f(\bullet)$ is defined such that the CN parameter $CN_{used}$ is given by $$CN_{used} = \frac{W_1(T_{active}) * \sum_{i=0}^{N_{curr}-1} CN_{curr}(i) + W_2(T_{active}) * \sum_{k=0}^{N_{prev}-1} CN_{prev}(k)}{W_1(T_{active}) * N_{curr} + W_2(T_{active}) * N_{prev}}$$

where $N_{curr}$ represents the number of frames corresponding to the time-interval parameter $T_{curr}$ and $N_{prev}$ represents the number of frames corresponding to the time-interval parameter $T_{prev}$; and where $W_1(T_{active})$ and $W_2(T_{active})$ are weighting functions.

Figure 8:
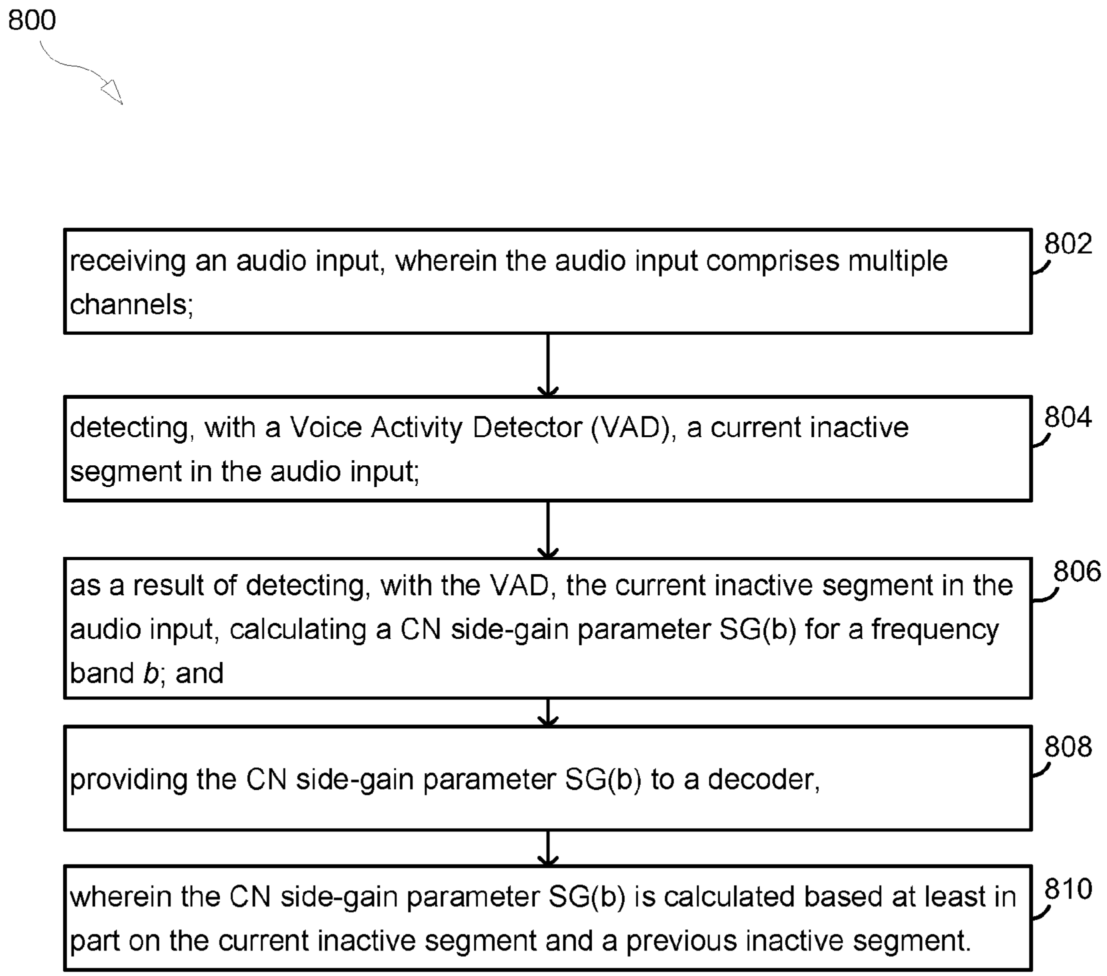
FIG. 8 is a flow chart illustrating a process according to one embodiment.

FIG. 8 illustrates a process 800 for generating a comfort noise (CN) side-gain parameter. The method includes receiving an audio input, wherein the audio input comprises multiple channels (step 802). The method further includes detecting, with a Voice Activity Detector (VAD), a current inactive segment in the audio input (step 804). The method further includes, as a result of detecting, with the VAD, the current inactive segment in the audio input, calculating a CN side-gain parameter SG(b) for a frequency band b (step 806). The method further includes providing the CN side-gain parameter SG(b) to a decoder (step 808). The CN side-gain parameter SG(b) is calculated based at least in part on the current inactive segment and a previous inactive segment (step 810).

In some embodiments, calculating the CN side-gain parameter SG(b) for a frequency band b, includes calculating $$SG(b) = \frac{\sum_{i=0}^{N_{curr}-1} SG_{curr}(b, i) + W(\mathrm{nF}) * \sum_{j=0}^{N_{prev}-1} SG_{prev}(b, j)}{N_{curr} + W(\mathrm{nF}) * N_{prev}}$$

where $SG_{curr}(b,i)$ represents a side gain value for frequency band b and frame i in current inactive segment; $SG_{prev}(b,j)$ represents a side gain value for frequency band b and frame j in previous inactive segment; $N_{curr}$ represents the number of frames in the sum from current inactive segment; $N_{prev}$ represents the number of frames in the sum from previous inactive segment; W(k) represents a weighting function; and nF represents the number of frames in the active segment between the current segment and the previous inactive segment, corresponding to $T_{active}$.

In some embodiments, W(k) is given by $$W(k) = \begin{cases} \frac{0.8 * (1500 - k)}{1500} + 0.2, & k < 1500 \\ 0.2, & k \geq 1500 \end{cases}$$

Figure 9:
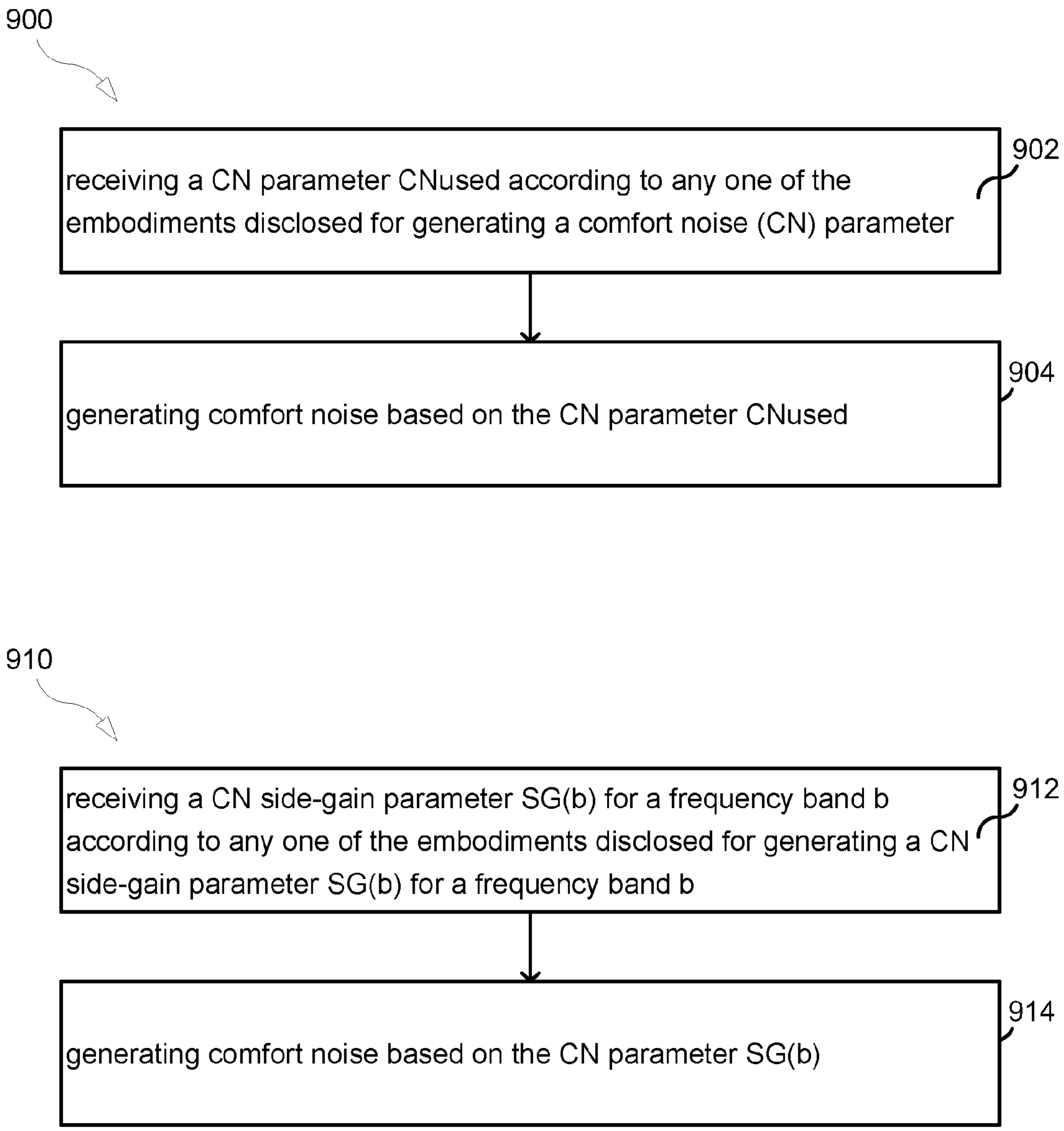
FIG. 9 is a flow chart illustrating a process according to one embodiment.

FIG. 9 illustrates a processes 900 and 910 for generating comfort noise (CN). According to process 900, the process includes a step of receiving a CN parameter $CN_{used}$ where the CN parameter $CN_{used}$ is generated according to any one of the embodiments herein disclosed for generating a comfort noise (CN) parameter (step 902) and a step of generating comfort noise based on the CN parameter $CN_{used}$ (step 904). According to process 910, the process includes a step of receiving a CN side-gain parameter SG(b) for a frequency band b where the CN side-gain parameter SG(b) for a frequency band b is generated according to any one of the embodiments herein disclosed for generating a CN side-gain parameter SG(b) for a frequency band b (step 912) and a step of generating comfort noise based on the CN parameter SG(b) (step 914).

Figure 10:
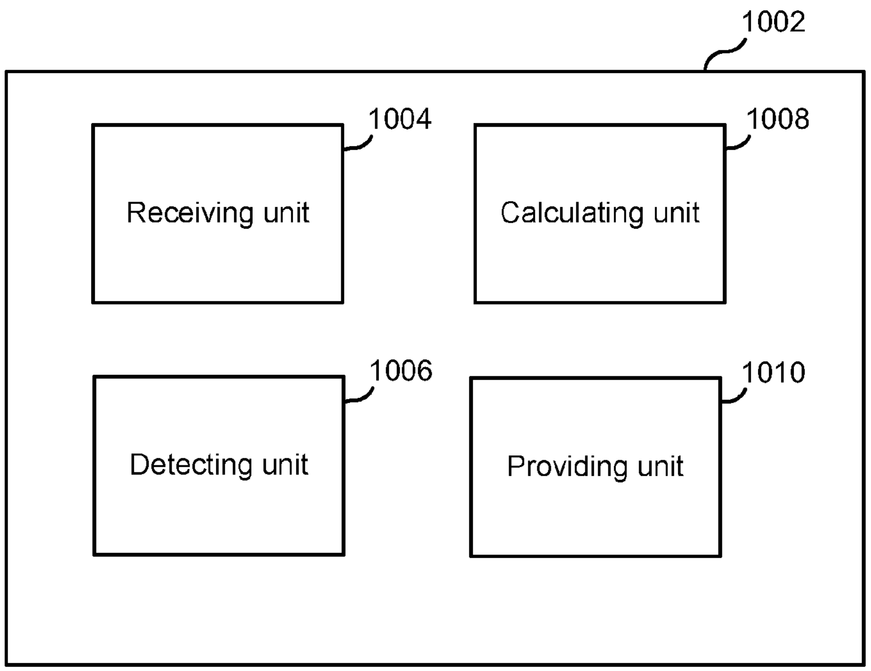
FIG. 10 is a diagram showing functional units of a node according to one embodiment.

FIG. 10 is a diagram showing functional units of node 1002 (e.g. an encoder/decoder) for generating a comfort noise (CN) parameter, according to an embodiment.

The node 1002 includes a receiving unit 1004 configured to receive an audio input; a detecting unit 1006 configured to detect, with a Voice Activity Detector (VAD), a current inactive segment in the audio input; a calculating unit 1008 configured to calculate, as a result of detecting, with the VAD, the current inactive segment in the audio input, a CN parameter $CN_{used}$; and a providing unit 1010 configured to provide the CN parameter $CN_{used}$ to a decoder. The CN parameter $CN_{used}$ is calculated by the calculating unit based at least in part on the current inactive segment and a previous inactive segment.

Figure 11:
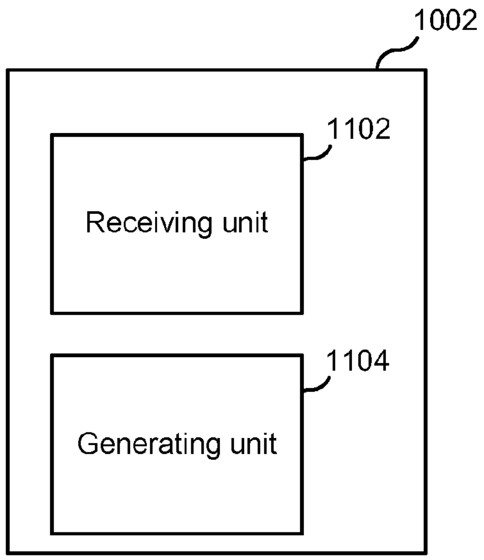
FIG. 11 is a diagram showing functional units of a node according to one embodiment.

FIG. 11 is a diagram showing functional units of node 1002 (e.g. an encoder/decoder) for generating a comfort noise (CN) side gain parameter, according to an embodiment. Node 1002 includes a receiving unit 1102 configured to receive a CN parameter $CN_{used}$ according to any one of the embodiments discussed with regard to FIG. 7 and a generating unit 1104 configured to generate comfort noise based on the CN parameter $CN_{used}$. In embodiments, the receiving unit is configured to receive a CN side-gain parameter SG(b) for a frequency band b according to any one of the embodiments discussed with regard to FIG. 8 and the generating unit is configured to generate comfort noise based on the CN parameter SG (b).

Figure 12:
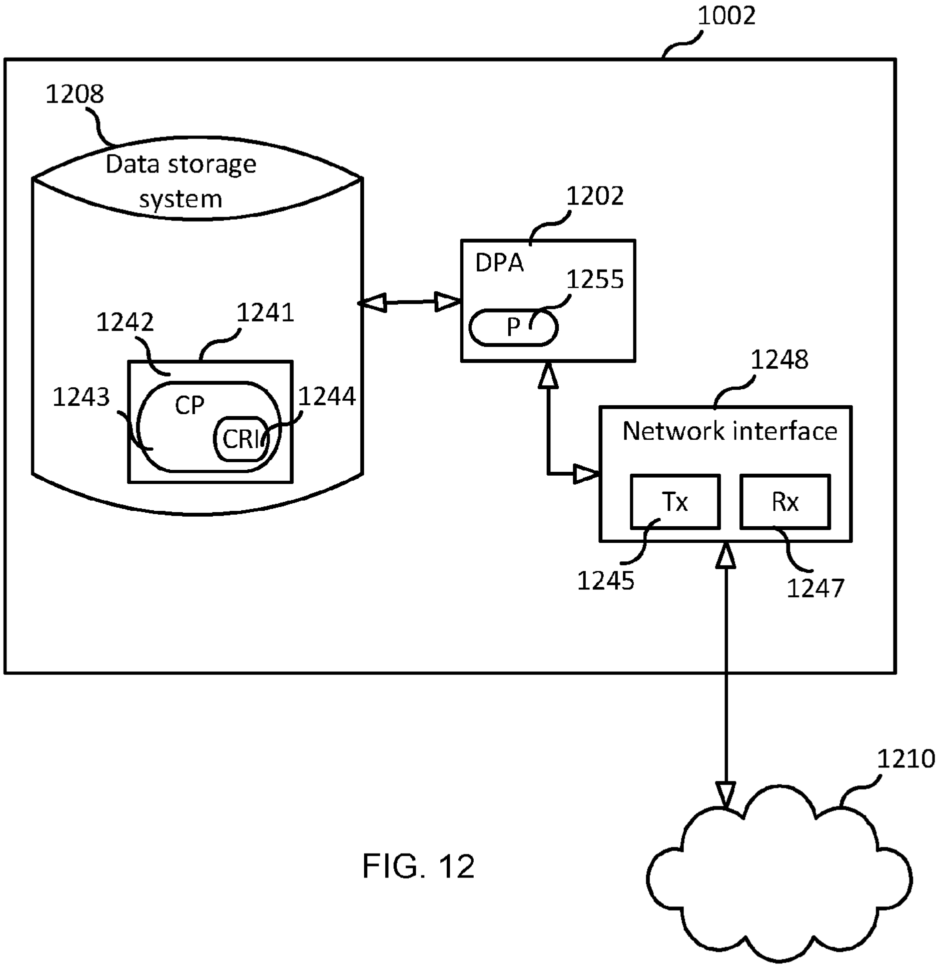
FIG. 12 is a block diagram of a node according to one embodiment.

FIG. 12 is a block diagram of node 1002 (e.g., an encoder/decoder) for generating a comfort noise (CN) parameter and/or for generating comfort noise (CN), according to some embodiments. As shown in FIG. 12, node 1002 may comprise: processing circuitry (PC) or data processing apparatus (DPA) 1202, which may include one or more processors (P) 1255 (e.g., a general purpose microprocessor and/or one or more other processors, such as an application specific integrated circuit (ASIC), field-programmable gate arrays (FPGAs), and the like); a network interface 1248 comprising a transmitter (Tx) 1245 and a receiver (Rx) 1247 for enabling node 1002 to transmit data to and receive data from other nodes connected to a network 1210 (e.g., an Internet Protocol (IP) network) to which network interface 1248 is connected; and a local storage unit (a.k.a., "data storage system") 1208, which may include one or more non-volatile storage devices and/or one or more volatile storage devices. In embodiments where PC 1202 includes a programmable processor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, magnetic media (e.g., a hard disk), optical media, memory devices (e.g., random access memory, flash memory), and the like. In some embodiments, the CRI 1244 of computer program 1243 is configured such that when executed by PC 1202, the CRI causes node 1002 to perform steps described herein (e.g., steps described herein with reference to the flow charts). In other embodiments, node 1002 may be configured to perform steps described herein without the need for code. That is, for example, PC 1202 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for determining a comfort noise (CN) side-gain parameter, the method comprising:

receiving an audio input, wherein the audio input comprises multiple channels;

detecting, with a Voice Activity Detector (VAD), a current inactive segment in the audio input; and based at least on detecting, with the VAD, the current inactive segment in the audio input, determining a CN side-gain parameter SG(b) for a frequency band b, wherein the CN side-gain parameter SG(b) is determined based at least in part on:

the current inactive segment, a previous inactive segment, and an active segment between the previous inactive segment and the current inactive segment, and wherein the CN side-gain parameter SG (b) for the frequency band b is a function of a plurality of parameters as follows:

$SG(b)=f(SG_{curr}(b,i),SG_{prev}(b,j),N_{curr},N_{prev},W(nF),nF)$, where $SG_{curr}(b,i)$ represents a side gain value for the frequency band b and for frame i in the current inactive segment;

$SG_{prev}(b,j)$ represents a side gain value for the frequency band b and for frame j in the previous inactive segment;

$N_{curr}$ represents a number of frames in the current inactive segment;

$N_{prev}$ represents a number of frames in the previous inactive segment;

W(nF) represents a weighting function; and nF represents a number of frames in the active segment between the current inactive segment and the previous inactive segment.

2. The method of claim 1, wherein the CN side-gain parameter SG(b) for the frequency band b is determined based at least on:

a time interval parameter of the active segment between the previous inactive segment and the current inactive segment or a number of frames in the active segment between the previous inactive segment and the current inactive segment, wherein the number of frames is more than one.

3. The method of claim 1, wherein the CN side-gain parameter SG(b) for the frequency band b is determined as follows:

$$SG(b)=\frac{\sum_{i=0}^{N_{curr}-1}SG_{curr}(b,i)+W(\mathrm{nF})*\sum_{j=0}^{N_{prev}-1}SG_{prev}(b,j)}{N_{curr}+W(\mathrm{nF})*N_{prev}}.$$

4. The method of claim 3, wherein W(nF) is given by:

$$W(k)=\begin{cases}\frac{0.8*(1500-k)}{1500}+0.2, & k<1500\\ 0.2, & k\geq 1500\end{cases}.$$

5. The method of claim 1, comprising:

providing the CN side-gain parameter SG(b) to a decoder.

6. A method for generating comfort noise (CN), the method comprising receiving a CN side-gain parameter SG(b) for a frequency band b; and generating the comfort noise based on the CN side-gain parameter SG(b), wherein the CN side-gain parameter is generated by:

detecting, with a Voice Activity Detector (VAD), a current inactive segment in an audio input comprising multiple channels, based at least on detecting, with the VAD, the current inactive segment in the audio input, determining the CN side-gain parameter SG(b) for the frequency band b, wherein the CN side-gain parameter SG(b) is determined based at least in part on:

the current inactive segment, a previous inactive segment, and an active segment between the previous inactive segment and the current inactive segment, and wherein the CN side-gain parameter SG(b) for the frequency band b is a function of a plurality of parameters as follows:

$SG(b)=f(SG_{curr}(b,i),SG_{prev}(b,j),N_{curr},N_{prev},W(nF),nF)$, where $SG_{curr}(b,i)$ represents a side gain value for the frequency band b and for frame i in the current inactive segment;

$SG_{prev}(b,j)$ represents a side gain value for the frequency band b and for frame j in the previous inactive segment;

$N_{curr}$ represents a number of frames in the current inactive segment;

$N_{prev}$ represents a number of frames in the previous inactive segment;

W(nF) represents a weighting function; and nF represents a number of frames in the active segment between the current inactive segment and the previous inactive segment.

7. The method of claim 6, wherein the CN side-gain parameter SG(b) for the frequency band b is determined based at least on:

a time interval parameter of the active segment between the previous inactive segment and the current inactive segment or a number of frames in the active segment between the previous inactive segment and the current inactive segment, wherein the number of frames is more than one.

8. The method of claim 6, wherein the CN side-gain parameter SG(b) for the frequency band b is determined as follows:

$$SG(b)=\frac{\sum_{i=0}^{N_{curr}-1}SG_{curr}(b,i)+W(\mathrm{nF})*\sum_{j=0}^{N_{prev}-1}SG_{prev}(b,j)}{N_{curr}+W(\mathrm{nF})*N_{prev}}.$$

9. The method of claim 8, wherein W(nF) is given by:

$$W(k)=\begin{cases}\frac{0.8*(1500-k)}{1500}+0.2, & k<1500\\ 0.2, & k\geq 1500\end{cases}.$$

10. A node for determining a comfort noise (CN) side-gain parameter, the node comprising:

processing circuitry; and a memory, said memory containing instructions executable by said processing circuitry, whereby the node is operative to:

receive an audio input, wherein the audio input comprises multiple channels;

detect, with a Voice Activity Detector (VAD), a current inactive segment in the audio input;

based at least on detecting, with the VAD, the current inactive segment in the audio input, determining a CN side-gain parameter SG(b) for a frequency band b, wherein the CN side-gain parameter SG(b) is determined based at least in part on:

the current inactive segment, a previous inactive segment, and an active segment between the previous inactive segment and the current inactive segment, and wherein the CN side-gain parameter SG(b) for the frequency band b is a function of a plurality of parameters as follows:

$SG(b)=f(SG_{curr}(b,i),SG_{prev}(b,j),N_{curr},N_{prev},W(nF),nF)$, where $SG_{curr}(b,i)$ represents a side gain value for the frequency band b and for frame i in the current inactive segment;

$SG_{prev}(b,j)$ represents a side gain value for the frequency band b and for frame j in the previous inactive segment;

$N_{curr}$ represents a number of frames in the current inactive segment;

$N_{prev}$ represents a number of frames in the previous inactive segment;

W(nF) represents a weighting function; and nF represents a number of frames in the active segment between the current inactive segment and the previous inactive segment.

11. The node of claim 10, wherein the CN side-gain parameter SG(b) for the frequency band b is determined based at least on:

a time interval parameter of the active segment between the previous inactive segment and the current inactive segment or a number of frames in the active segment between the previous inactive segment and the current inactive segment, wherein the number of frames is more than one.

12. The node of claim 10, wherein the CN side-gain parameter SG(b) for the frequency band b is determined as follows:

$$SG(b) = \frac{\sum_{i=0}^{N_{curr}-1} SG_{curr}(b, i) + W(\text{nF}) * \sum_{j=0}^{N_{prev}-1} SG_{prev}(b, j)}{N_{curr} + W(\text{nF}) * N_{prev}}.$$

13. The node of claim 12, wherein W(nF) is given by:

$$W(k) = \begin{cases} \frac{0.8 * (1500 - k)}{1500} + 0.2, & k < 1500 \\ 0.2, & k \geq 1500 \end{cases}.$$

14. The node of claim 10, wherein the node is operative to:

provide the CN side-gain parameter SG(b) to a decoder.

* * * * *